US006690862B1

(12) United States Patent
Rietveld

(10) Patent No.: US 6,690,862 B1
(45) Date of Patent: Feb. 10, 2004

(54) OPTICAL FIBER CIRCUIT

(75) Inventor: Willy Rietveld, Benschop (NL)

(73) Assignee: Tyco Electronic Corporation, Middletown, PA (US)

( * ) Notice: Subject to any disclaimer, the term of this patent is extended or adjusted under 35 U.S.C. 154(b) by 0 days.

(21) Appl. No.: 09/803,768

(22) Filed: Mar. 12, 2001

Related U.S. Application Data
(60) Provisional application No. 60/188,427, filed on Mar. 10, 2000.

(51) Int. Cl.[7] .................................................. G02B 6/28
(52) U.S. Cl. .............................. 385/39; 385/24; 385/46
(58) Field of Search ............................. 385/16, 17, 31, 385/39, 46, 15, 24, 47

(56) References Cited

U.S. PATENT DOCUMENTS 5,155,785 A  * 10/1992  Holland et al. ............... 385/89
5,259,051 A  * 11/1993  Burack et al. ............... 156/158
5,841,917 A  * 11/1998  Jungerman et al. ........... 385/15
6,181,845 B1 *  1/2001  Horsthuis et al. ............. 385/17

FOREIGN PATENT DOCUMENTS

WO      WO 9913367 A2  *  3/1999  ............ G02B/6/26

* cited by examiner

Primary Examiner—Robert H. Kim
Assistant Examiner—Michael H Caley

(57) ABSTRACT

An optical circuit comprises: (a) a body having an x and y axis and two sides substantially parallel to the y-axis and separated along the x-axis; (b) a plurality of first ports along one of the two sides, each first port comprising a number of substantially paralleled fibers; and (c) a plurality of second ports along the other of the two sides, each second port comprising a number of substantially parallel fibers. The ports are interconnected with the fibers such that (i) the fibers of a given second port comprise a fiber from each of the first ports, and (ii) the fibers interconnecting the first and second ports are arranged asymmetrically about at least one of the x or y axes.

11 Claims, 1 Drawing Sheet

OPTICAL FIBER CIRCUIT

REFERENCE TO A RELATED APPLICATION

This application is based on provisional application No. 60/188,427, filed on Mar. 10, 2000.

FIELD OF INVENTION

The present invention related generally to optical circuits, and, more specifically, to an optical circuit in which fibers interconnect input and output ports.

BACKGROUND OF THE INVENTION

The use of optical fiber circuits to manage the fibers between optical connections has increased dramatically in recent years. The primary reason for this dramatic increase is the constant desire to increase the density of optical connections. In other words, there is a strong impetus to increase the number of fibers that can be optically connected in a given space. As the density of the optical connections increases, the need to manage the ganglia of fibers associated therewith increases in kind. As used herein, the term "optical fiber circuit" refers broadly to an arrangement of fibers that interconnects one set of ports with another set of ports. The arrangement of fibers is fixed to some medium to prevent its movement. The terms "input port" and "output port" are used herein for illustrative purposes to provide a distinction between the two sets of ports. It should be understood, however, that this designation should not limit the invention to a particular propagation of light through the ports.

The particular use of optical fiber circuits varies although a preferred use is in an optical cross-connect. As used herein, the term "optical cross connect" refers generally to any device that optically interconnects groupings or "nodes" of fibers with other nodes of fibers. Typically, but not necessarily, a node corresponds to a port on the optical circuit. The term "perfect shuffle" as used herein refers to a particular configuration of an optic cross-connect in which each output node contains a fiber from each input node. Thus, in a perfect shuffle, the number of interconnections for each node is equivalent to the number of nodes. For example, to effect the interconnection of eight input nodes to eight output nodes, there must be eight interconnections per node.

The applicants have found that as the number of input and output ports (or nodes) increases in an optical fiber circuit, the problems facing the fiber layout increase as well. Of particular concern is the introduction of skew. Skew refers to a differential in length among the fibers connecting the various ports together. If this differential becomes large, it can result in a significant difference in the port-to-port transmission time among the various ports. This is generally unacceptable. The applicants have determined that running the individual fibers along straight lines between ports is an effective approach to reducing skew. Such an approach minimizes the port-to-port distances compared to other fiber layout approaches in which the fibers are channeled together in a common bus from one set of ports to the other.

The direct port-to-port approach results in fibers traversing diagonally across the optical circuit since the fibers of a given input port are interconnected to each of the output ports. This is not problematic in itself; however, when the number of ports increases, the incidence of "fiber stacking" among the diagonals increases exponentially. More specifically, a symmetrical arrangement of fibers that interconnects input and output ports along straight lines results in the stacking of multiple fibers at certain points on the optical circuit. The number of fibers in a stack can be quite high, especially as the number of ports and fibers increases.

Applicants have identified a number of problems associated with the stacking of multiple fibers. In particular, the fibers toward the top of the stack are forced to bend more to get over the stack. Once the stack is about three of four fibers high, the amount of bending experienced by subsequently stacked fibers to clear the stack may exceed the fiber's minimum bend radius. This introduces optical losses and can compromise the integrity of the optical transmission path in general.

Aside from degrading optical performance, fiber stacking also introduces structural problems. Specifically, the height of the stack itself becomes an issue since, as a high spot, it tends to be subjected to external aggression more so than the lower lying portions of the optical circuit. After repeated scrapping and knocking, the top fibers' performance can suffer. A tall stack also presents problems in laminating the fibers since the stack serves to separate the top and bottom layers of the optical circuit, thereby making adhesion between them more difficult.

Therefore, there is a need for an optical circuit design which provides for fiber shuffling between the input and output ports but which avoids the aforementioned problems of fiber stacking. The present invention fulfills this need among others.

SUMMARY OF INVENTION

The present invention provides for an optical circuit that minimizes skew but avoids fiber stacking by using an asymmetrical fiber arrangement for interconnecting the input and output nodes. The applicant has found that by asymmetrically arranging the fibers, the incidence of fiber stacking is reduced considerably. Furthermore, applicants have found that a sufficient degree of asymmetry may be introduced into the circuit if the point at which the fibers converge/diverge at the various ports is staggered.

Accordingly, one aspect of the invention is an optical circuit in which the fibers interconnecting the ports are arranged asymmetrically about at least one axis of the fiber circuit. In a preferred embodiment, the optical circuit comprises: (a) a body having an x and y axis and two sides substantially parallel to the y-axis and separated along the x-axis; (b) a plurality of first ports along one of the two sides, each first port comprising a number of substantially paralleled fibers; (c) a plurality of second ports along the other of the two sides, each second port comprising a number of substantially parallel fibers. The ports are interconnected with the fibers such that (i) the fibers of a given second port comprise a fiber from each of the first ports, and (ii) the fibers interconnecting the first and second ports are arranged asymmetrically about at least one of the x or y axes. Preferably, the fibers of a given port diverge from parallel on the body at a divergence point and the divergence points of at least one of the first ports or the second ports are staggered along the x axis. Furthermore, the fibers interconnecting the first and second ports preferably are arranged symmetrically about the y axis.

DETAILED DESCRIPTION OF PREFERRED EMBODIMENT

Figure 1:
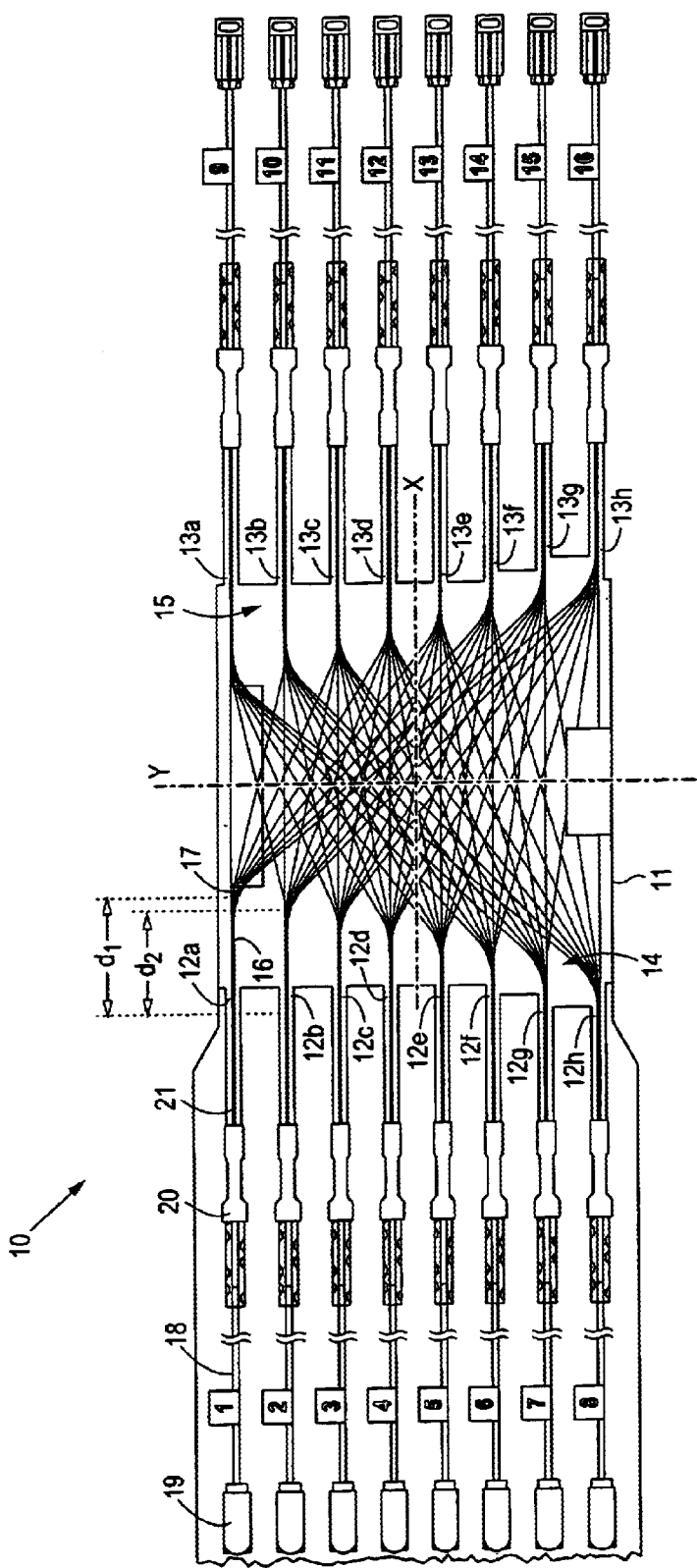
FIG. 1 shows a preferred embodiment of an optical circuit of the present intention in which the points of diversion of the fibers of each node are staggered.

Referring to FIG. 1, a preferred embodiment of the optical circuit 10 of present intention is shown. The optical circuit comprises a body 11 having an x and y axis and two sides 14, 15 substantially parallel to the y-axis and separated along the x-axis. A plurality of first ports 12a–h is disposed along one side 14, and a plurality of second ports 13a–h is disposed along the other side 15. Each port comprises a number of substantially paralleled fibers. These parallel fibers are indicated as 16 for port 12a.

The fibers of the ports are arranged to interconnect the first and second ports along straight, hence, diagonal lines. In a preferred embodiment, the fibers of a given second port, for example port 13a, comprise a fiber from each of the first ports 12a–h. The fibers interconnecting the first and second ports are arranged asymmetrically about at least one of the x or y axes. In the embodiment shown in FIG. 1, the fibers are asymmetrical about the x-axis. It should be understood, however, that the fibers could be arranged asymmetrically with respect to the y-axis or even both axes.

Applicants have determined that although asymmetry in the fiber arrangement is preferred from a fiber stacking standpoint, a certain amount of symmetry is preferred from a design and manufacturing standpoint since symmetrical designs lend themselves to automation. Applicants have further determined that a sufficient amount of asymmetry is imparted into the layout if the points at which the fibers diverge/converge from the ports are staggered. More specifically, the fibers of a given port diverge from parallel on the body at a divergence point; for example, divergent point 17 for port 12a. In a preferred embodiment, the divergence points of either the first ports 12a–h or the second ports 13a–h are staggered along the x axis. More preferably, the divergence points of both the first ports and the second ports are staggered along the x-axis. In this embodiment, the fiber arrangement about the y axis is symmetrical.

In a preferred embodiment, the divergence points are staggered such that the distance from the divergence point of each port from the side of the base, e.g., $d_1$ in the case of port 12a, incrementally increases or decreases from a port at one end of the y-axis, i.e, port 12a, to the port at the other end of the y-axis, i.e., port 12h. The incremental difference $\Delta d$, for example, $d_1$–$d_2$, preferably is at least about 1% of the overall distance of the body along the x-axis. More preferably, $\Delta d$ is close to about 3% of the overall distance.

The interconnection of the various ports by the fibers can vary and the invention contemplates circuits other than perfect shuffles. Preferably, however, the number of fibers of each first port is equal to the number of second ports. This way, each second port may comprise a fiber from each of the first ports. In a perfect shuffle, the number of fibers of each first port is equal to the number of first ports, and, accordingly, the number of the first ports is equal to the number of second ports. Such an embodiment is shown in FIG. 1. It should be understood, however, that the present invention is not limited to an 8×8 port configuration and may be practiced with various optical circuit configurations including, e.g., 2×2, 3×3, 4×4, and 10×10. Furthermore, the present invention is not limited to perfect shuffles, and may be used in non-perfect shuffle optical circuits such as 2×4, 2×8, 4×6, and 6×8.

The manufacture of the optical circuit of the present invention can be achieved using known techniques and existing machinery. For example, in one embodiment, the fibers are laid on a flexible substrate which has an adhesive applied thereto to hold the fibers in position. Next, a flexible top layer is applied over the fibers and substrate, thereby laminating the fibers. Other manufacturing techniques will be apparent to those skilled in the art and are within the scope of the present invention. For example, the substrate need not be flexible. For the matter, a substrate need not be used and the fibers may be held in place by an overmolded material instead.

The optical circuit of the present invention can be used in a variety of applications. In a preferred embodiment, the circuit is used for backplane interconnections. The optical circuit shown in FIG. 1 is configured for such an application. More specifically, the optical circuit has a tab 21 for each port. The fibers extending from the tabs 21 may be spliced to a pigtail 18 which is terminated with a multi-fiber ferrule optical connector 19. An example of a multi-fiber ferrule connector is the Lightray MPX™ connector interconnect system commercially available through Tyco Electronics (Harrisburg, Penn.). It is generally preferred that a slice protector 20 be used to cover the splice of the pig tail to the tab 21.

The optical fiber circuit of the present invention is also well suited as an optical cross connects for switching in dense wavelength division multiplex (DWDM) networks as found in mesh/ring long-distance networks, metro rings, and feeder rings. In such applications, a network fiber may contain many channels of optical signals with each channel propagating at a different wavelength. To effect switching, these channels must be separated or "de-multiplexed," such that each channel propagates on a dedicated fiber. At this point, each fiber can be interconnected from one input node to each of the output nodes. The various channels contained on discrete fibers corresponding to a particular output node are then combined or "multiplexed" on to a fiber to again achieve a DWDM transmission.

Still other applications for the optical circuit of the present invention are possible.

What is claimed is:

1. An optical circuit comprising:
    a body having an x and y axis and two sides substantially parallel to said y-axis and separated along said x-axis;
    fibers mounted on said body;
    a plurality of first ports along one of said two sides, each first port comprising a number of substantially paralleled fibers;
    a plurality of second ports along the other of said two sides, each second port comprising a number of substantially parallel fibers; and
    wherein said first and second ports are interconnected with said fibers such that (i) the fibers of each second port comprise a fiber from each of said first ports, (ii) the fibers interconnecting said first and second ports are arranged asymmetrically about at least said x axis, (iii) the fibers of a given port diverge from parallel on said body at a divergence point, and (iv) the divergence points of both said first ports and said second ports are staggered along the x-axis.

2. An optical circuit comprising:
    a body having an x and y axis and two sides substantially parallel to said y-axis and separated along said x-axis;
    fibers mounted on said body;
    a plurality of first ports along one of said two sides, each first port comprising a number of substantially paralleled fibers;
    a plurality of second ports along the other of said two sides, each second port comprising a number of substantially parallel fibers; and
    wherein said first and second ports are interconnected with said fibers such that (i) the fibers of each second port comprise a fiber from each of said first ports, (ii) the fibers interconnecting said first and second ports are arranged asymmetrically about said x axis and are arranged symmetrically about the y axis, (iii) the fibers of a given port diverge from parallel on said body at a divergence point, and (iv) the divergence points of at least one of said first ports or said second ports are staggered along the x axis.

3. An optical circuit comprising:

a body having an x and y axis and two sides substantially parallel to said y-axis and separated along said x-axis;

fibers mounted on said body;

a plurality of first ports along one of said two sides, each first port comprising a number of substantially paralleled fibers;

a plurality of second ports along the other of said two sides, each second port comprising a number of substantially parallel fibers; and wherein said first and second ports are interconnected with said fibers such that (i) the fibers of each second port comprise a fiber from each of said first ports, (ii) the fibers interconnecting said first and second ports are arranged asymmetrically about at least said x axis, (iii) the fibers of a given port diverge from parallel on said body at a divergence point, (iv) the divergence points of at least one of said first ports or said second ports are staggered along the x axis such that the distance between the side of the body and the divergent points increases sequentially from a port at one end of the y-axis to a port at the other end of the y-axis.

4. The optical circuit of claim 3, wherein the increase in distance is at least about 1% of the overall distance of the body along the x-axis.

5. The optical circuit of claim 4, wherein the increase in distance is about 3% of the overall distance of the body along the x-axis.

6. An optical circuit comprising:

a body having an x and y axis and two sides substantially parallel to said y-axis and separated along said x-axis;

fibers mounted on said body;

a plurality of first ports along one of said two sides, each first port comprising a number of substantially paralleled fibers;

a plurality of second ports along the other of said two sides, each second port comprising a number of substantially parallel fibers wherein the number of fibers of each first port is equal to the number of said second ports; and wherein said first and second ports are interconnected with said fibers such that (i) the fibers of each second port comprise a fiber from each of said first ports, (ii) the fibers interconnecting said first and second ports are arranged asymmetrically about at least said x axis, (iii) the fibers of a given port diverge from parallel on said body at a divergence point, and (iv) the divergence points of at least two of said first ports or said second ports are staggered along the x axis.

7. The optical circuit of claim 6, wherein the number of fibers of each first port is equal to the number of said first ports.

8. The optical circuit of claim 7, wherein the number of said first ports is equal to the number of said second ports.

9. The optical circuit of claim 8, wherein the number is at least four.

10. The optical circuit of claim 9, wherein the number is eight.

11. An optical circuit comprising:

a body having an x and y axis and two sides substantially parallel to said y-axis and separated along said x-axis;

fibers mounted on said body;

a plurality of first ports along one of said two sides, each first port comprising a number of substantially paralleled fibers;

a plurality of second ports along the other of said two sides, each second port comprising a number of substantially parallel fibers; and wherein said first and second ports are interconnected with said fibers such that (i) the fibers of each second port comprise a fiber from each of said first ports, (ii) the fibers interconnecting said first and second ports are arranged asymmetrically about at least said x axis, (iii) the fibers of a given port diverge from parallel on said body at a divergence point, (iv) the divergence points of at least two of said first ports or said second ports are staggered along the x axis, and (v) said fibers interconnecting said first and second ports are arranged such that said first and second ports are connected along straight lines.

* * * * *